(12) United States Patent
Khajepour et al.

(10) Patent No.: US 12,084,064 B2
(45) Date of Patent: Sep. 10, 2024

(54) UNIVERSAL MACHINE LEARNING BASED SYSTEM FOR ESTIMATING A VEHICLE STATE

(71) Applicants: GM Global Technology Operations LLC, Detroit, MI (US); University of Waterloo, Waterloo (CA)

(72) Inventors: Amir Khajepour, Waterloo (CA); Amin Habibnejad Korayem, Markham (CA); Ehsan Hashemi, Waterloo (CA); Qingrong Zhao, Warren, MI (US); SeyedAlireza Kasaiezadeh Mahabadi, Novi, MI (US); Yechen Qin, Beijing (CN)

(73) Assignees: GM GLOBAL TECNOLOGY OPERATIONS LLC, Detroit, MI (US); UNIVERSITY OF WATERLOO, Waterloo (CA)

( * ) Notice: Subject to any disclaimer, the term of this patent is extended or adjusted under 35 U.S.C. 154(b) by 127 days.

(21) Appl. No.: 17/933,554

(22) Filed: Sep. 20, 2022

(65) Prior Publication Data
US 2024/0092371 A1    Mar. 21, 2024

(51) Int. Cl.
*B60W 40/10* (2012.01)
*B60W 40/13* (2012.01)
*G07C 5/08* (2006.01)

(52) U.S. Cl.
CPC ............ *B60W 40/10* (2013.01); *B60W 40/13* (2013.01); *G07C 5/085* (2013.01); *B60W 2040/1315* (2013.01)

(58) Field of Classification Search
CPC ................ B60W 40/10; B60W 40/13; B60W 2040/1315; G07C 5/085
USPC ............................................................ 701/1
See application file for complete search history.

(56) References Cited

U.S. PATENT DOCUMENTS

| | | | |
|---|---|---|---|
| 2013/0054049 A1* | 2/2013 | Uno | B60W 30/18145 701/1 |
| 2016/0264148 A1* | 9/2016 | Liu | B60W 40/06 |
| 2019/0066535 A1* | 2/2019 | Pifko | G09B 19/167 |
| 2023/0219561 A1* | 7/2023 | El-Shaer | B60W 60/001 701/23 |

* cited by examiner

*Primary Examiner* — Krishnan Ramesh
(74) *Attorney, Agent, or Firm* — Vivacqua Crane, PLLC (57) ABSTRACT

A universal machine learning based system for estimating a vehicle state of a vehicle includes one or more controllers executing instructions to receive a plurality of dynamic variables and corresponding historical data. The controllers execute a sensitivity analysis algorithm to determine a sensitivity level for each dynamic variable and corresponding historical data and select two or more pertinent dynamic variables based on the sensitivity level of each dynamic variable and the corresponding historical data. The controllers standardize the two or more pertinent dynamic variables into a plurality of generic dynamic variables, wherein the plurality of generic dynamic variables are in a standardized format that is applicable to any configuration of vehicle, and estimate the vehicle state based on the plurality of generic dynamic variables by one or more machine learning algorithms.

20 Claims, 3 Drawing Sheets

UNIVERSAL MACHINE LEARNING BASED SYSTEM FOR ESTIMATING A VEHICLE STATE

INTRODUCTION

The present disclosure relates to a universal machine learning based system that estimates a vehicle state based on two or more generic dynamic variables, where the generic dynamic variables are in a standardized format that is applicable to any configuration of vehicle.

Many vehicles today are equipped with motion control systems for enhancing driver control. Vehicle motion control systems rely upon knowledge of several vehicle states such as, for example, estimated longitudinal and lateral velocity, under various operating conditions. The vehicle states are usually not measured directly because the sensors for measuring the basic states of a vehicle tend to be costly and are not always accurate. Thus, current systems may employ a model-based approach to estimate the vehicle states. However, the model-based approach may not always yield precise estimates in many instances because of unmodeled dynamics and uncertainties during non-linear operating conditions. Some examples of non-linear operating conditions for a vehicle include, but are not limited to, extreme maneuvers, very high speeds, and slippery roadway conditions.

There are several machine learning based estimation approaches that are currently available for estimating longitudinal and lateral velocity of a vehicle, however, these approaches are not widely used. Furthermore, machine learning based estimation approaches are focused on a single vehicle configuration. Accordingly, machine learning based estimation approaches require re-training when applying the machine learning model to another vehicle having a different configuration. Re-training the machine learning models for different vehicle configurations may be costly and labor-intensive.

Thus, while current systems achieve their intended purpose, there is a need in the art for an improved approach for estimating vehicle states that may be used across different vehicle configurations.

SUMMARY

According to several aspects, a universal machine learning based system for estimating a vehicle state of a vehicle is disclosed. The universal machine learning based system includes one or more controllers executing instructions to receive a plurality of dynamic variables and corresponding historical data, where the plurality of dynamic variables each represent an operating parameter of the vehicle that is relevant for estimating the vehicle state. The one or more controllers execute a sensitivity analysis algorithm to determine a sensitivity level for each dynamic variable and corresponding historical data, where the sensitivity level indicates the effect of a selected dynamic variable on the vehicle state. The one or more controllers select two or more pertinent dynamic variables based on the sensitivity level of each dynamic variable and the corresponding historical data. The one or more controllers standardize the two or more pertinent dynamic variables into a plurality of generic dynamic variables, wherein the plurality of generic dynamic variables are in a standardized format that is applicable to any configuration of vehicle. The one or more controllers estimate the vehicle state based on the plurality of generic dynamic variables by one or more machine learning algorithms.

In an aspect, the one or more controllers determine an individual generic dynamic variable by identifying a relevant vehicle parameter that corresponds to a pertinent dynamic variable and combining the relevant vehicle parameter with a pertinent dynamic variable to determine a generic dynamic variable.

In another aspect, the one or more controllers identify the relevant vehicle parameter based on one or more model-based dynamic equations that solve for the vehicle state. At least one of the model-based dynamic equations include the pertinent dynamic variable and the relevant vehicle parameter.

In still another aspect, the relevant vehicle parameter is a fixed value representing a parameter of either the vehicle or data collected from another configuration of vehicle that is part of a training dataset.

In an aspect, the relevant vehicle parameter is one of the following: vehicle weight, vehicle yaw moment of inertia, wheel effective radius, vehicle track width, vehicle front axle to center-of-gravity (CG) distance, vehicle rear axle CG distance, and steering ratio.

In another aspect, combining the relevant vehicle parameter with the pertinent dynamic variable includes one or more of the following: multiplying, dividing, adding, or subtracting the pertinent dynamic variable with the generic dynamic variable.

In yet another aspect, selecting the two or more pertinent dynamic variables based on the sensitivity level of each dynamic variable and the corresponding historical data comprises comparing the sensitivity level for each dynamic variable and the corresponding historical data with a sensitivity threshold value, and in response to determining the sensitivity level for a selected dynamic variable is equal to or greater than the sensitivity threshold value, selecting the selected dynamic variable or the corresponding historical data as one of the pertinent dynamic variables.

In an aspect, the sensitivity analysis algorithm is gradient boosted regression trees (GBRT) modeling.

In another aspect, the system comprises a plurality of sensors configured to monitor data indicative of a dynamic state of a vehicle and one or more vehicle controllers, where the plurality of sensors and the one or more vehicle controllers are in electronic communication with the one or more controllers.

In yet another aspect, the plurality of dynamic variables are generated by the plurality of sensors and the one or more vehicle controllers.

In an aspect, the vehicle state is one of the following: lateral velocity, longitudinal velocity, normal tire force, longitudinal tire force, lateral tire force, sideslip, slip ratio, bank angle, grade angle, roll stiffness, pitch stiffness, vehicle mass, and pitch angle.

In another aspect, the configuration of the vehicle indicates one or more of the following: driveline configuration, vehicle class, and powertrain configuration.

In an aspect, a vehicle including a universal machine learning based system for estimating a vehicle state of a vehicle. The vehicle includes a plurality of sensors configured to monitor data indicative of a dynamic state of the vehicle, one or more vehicle controllers, and one or more controllers in electronic communication with the plurality of sensors and the one or more vehicle controllers. The one or more controllers execute instructions to receive a plurality of dynamic variables and corresponding historical data from the plurality of sensors and the one or more vehicle controllers, wherein the plurality of dynamic variables each represent an operating parameter of the vehicle that is relevant for estimating the vehicle state. The one or more controllers execute a sensitivity analysis algorithm to determine a sensitivity level for each dynamic variable and corresponding historical data, where the sensitivity level indicates the effect of a selected dynamic variable on the vehicle state. The one or more controllers select two or more pertinent dynamic variables based on the sensitivity level of each dynamic variable and the corresponding historical data. The one or more controllers standardize the two or more pertinent dynamic variables into a plurality of generic dynamic variables, where the plurality of generic dynamic variables are in a standardized format that is applicable to any configuration of vehicle. The one or more controllers estimate the vehicle state based on the plurality of generic dynamic variables by one or more machine learning algorithms.

In an aspect, the one or more controllers determine an individual generic dynamic variable by identifying a relevant vehicle parameter that corresponds to a pertinent dynamic variable, and combining the relevant vehicle parameter with the pertinent dynamic variable to determine a generic dynamic variable.

In another aspect, the one or more controllers identify the relevant vehicle parameter based on one or more model-based dynamic equations that solve for the vehicle state, wherein at least one of the model-based dynamic equations include the pertinent dynamic variable and the relevant vehicle parameter.

In yet another aspect, the relevant vehicle parameter is a fixed value representing a parameter of either the vehicle or data collected from another configuration of vehicle that is part of a training dataset.

In an aspect, a method for estimating a vehicle state of a vehicle by a universal machine learning based system. The method includes receiving, by one or more controllers, a plurality of dynamic variables and corresponding historical data, wherein the plurality of dynamic variables each represent an operating parameter of the vehicle that is relevant for estimating the vehicle state. The method includes executing a sensitivity analysis algorithm to determine a sensitivity level for each dynamic variable and corresponding historical data, wherein the sensitivity level indicates the effect of a selected dynamic variable on the vehicle state. The method also includes selecting two or more pertinent dynamic variables based on the sensitivity level of each dynamic variable and the corresponding historical data. The method includes standardizing the two or more pertinent dynamic variables into a plurality of generic dynamic variables, where the plurality of generic dynamic variables are in a standardized format that is applicable to any configuration of vehicle. Finally, the method includes estimating the vehicle state based on the plurality of generic dynamic variables by one or more machine learning algorithms.

In another aspect, the method includes identifying, by the one or more controllers, a relevant vehicle parameter that corresponds to the pertinent dynamic variable and combining the relevant vehicle parameter with a pertinent dynamic variable to determine a generic dynamic variable.

In another aspect, the method includes identifying the relevant vehicle parameter based on one or more model-based dynamic equations that solve for the vehicle state, where at least one of the model-based dynamic equations include the pertinent dynamic variable and the relevant vehicle parameter.

In yet another aspect, selecting the two or more pertinent dynamic variables based on the sensitivity level of each dynamic variable and the corresponding historical data comprises comparing the sensitivity level for each dynamic variable and the corresponding historical data with a sensitivity threshold value, and in response to determining the sensitivity level for a selected dynamic variable is equal to or greater than the sensitivity threshold value, selecting the selected dynamic variable or the corresponding historical data as one of the pertinent dynamic variables.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
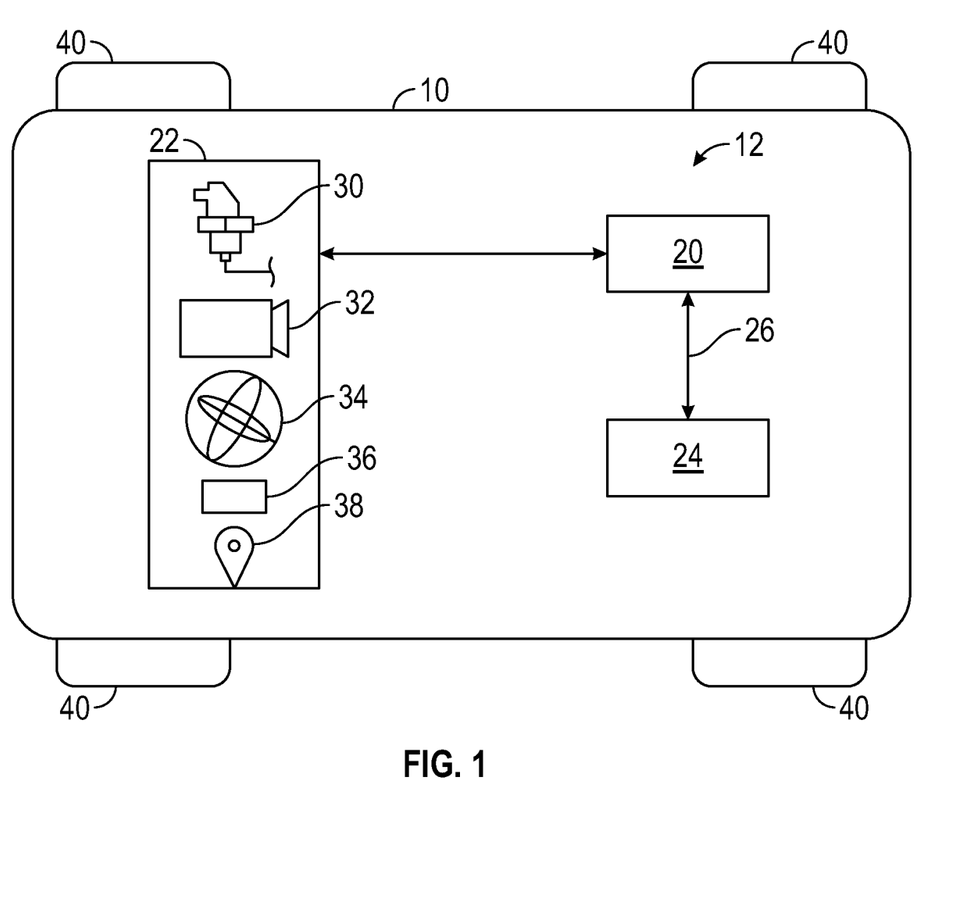
FIG. 1 is a schematic diagram of a vehicle including the disclosed universal machine learning based system for estimating a vehicle states, where the system includes one or more controllers in electronic communication with a plurality of sensors, according to an exemplary embodiment.

Referring to FIG. 1, an exemplary vehicle 10 including a universal machine learning based system 12 for estimating one or more vehicle states is illustrated. The vehicle 10 may be any type of vehicle such as, but not limited to, a sedan, truck, sport utility vehicle, van, a ride-share vehicle, or motor home. The universal machine learning based system 12 includes one or more controllers 20 in electronic communication with a plurality of sensors 22 configured to monitor data indicative of a dynamic state of the vehicle 10. In the non-limiting embodiment as shown in FIG. 1, the plurality of sensors 22 include one or more wheel speed sensors 30 for measuring an angular wheel speed velocity $\omega_w$ of one or more wheels 40 of the vehicle 10, one or more cameras 32, an inertial measurement unit (IMU) 34, one or more steering angle sensors 36, and a global positioning system (GPS) 38, however, is to be appreciated that additional sensors may be used as well. The one or more controllers 20 are also in electronic communication with one or more vehicle controllers 24 by a vehicle bus 26. The vehicle controllers 24 correspond to other vehicle systems that are part of the vehicle 10. In one non-limiting embodiment, the vehicle bus 26 is a controller area network (CAN) bus that allows for the controller 20 to communicate with the vehicle controllers 24.

Figure 2:
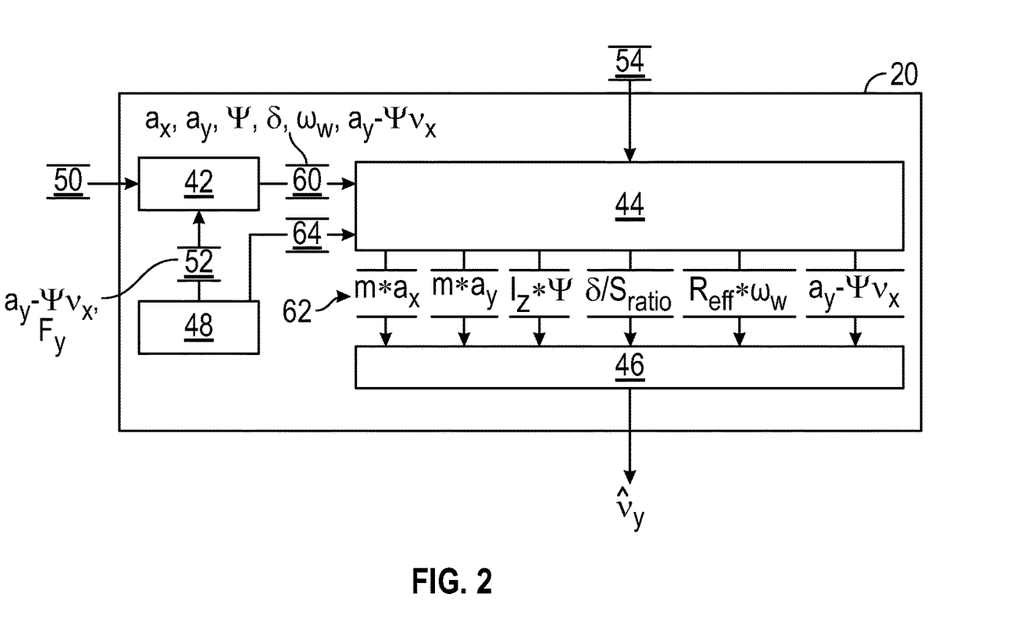
FIG. 2 is a block diagram of the one or more controllers shown in FIG. 1 estimating a lateral velocity, according to an exemplary embodiment.
Figure 3:
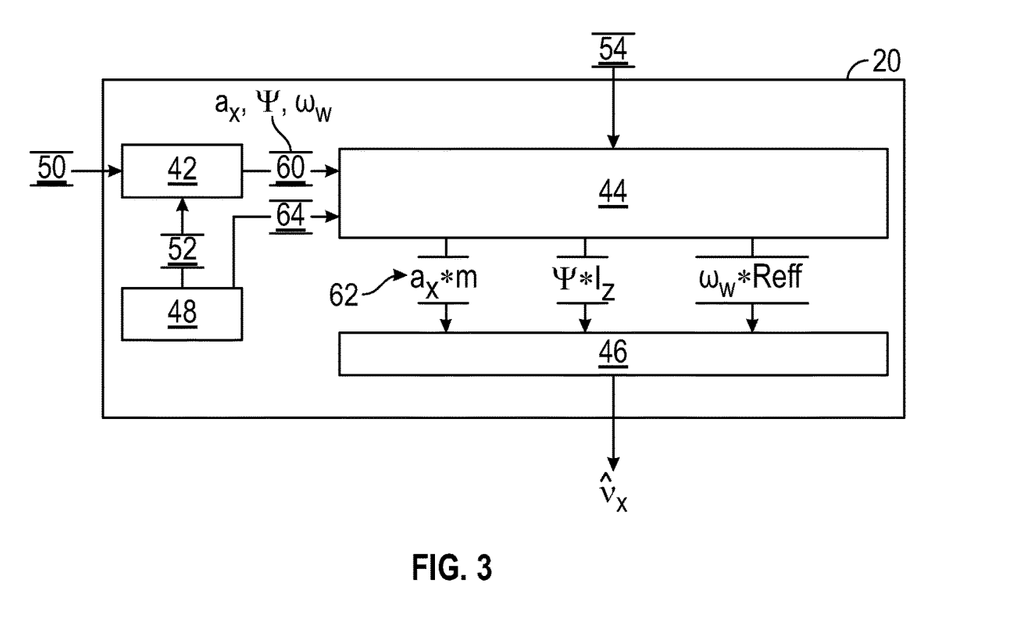
FIG. 3 is a block diagram of the one or more controllers shown in FIG. 1 estimating a longitudinal velocity, according to an exemplary embodiment.

As explained below, the disclosed universal machine learning based system 12 estimates a vehicle state associated with the vehicle 10 based on two or more generic dynamic variables, where the generic dynamic variables are in a standardized format that is applicable to any configuration of vehicle. In the embodiments as shown in FIGS. 2-3 and as described below, the universal machine learning based system 12 estimates a lateral velocity $\widehat{v_y}$ and a longitudinal velocity $\widehat{v_x}$ of the vehicle 10. However, it is to be appreciated that the figures are merely exemplary and the universal machine learning based system 12 estimates other vehicle states as well such as, but not limited to, normal tire force, longitudinal tire force, lateral tire force, sideslip, slip ratio, bank angle, grade angle, roll stiffness, pitch stiffness, vehicle mass, and pitch angle.

It is to be appreciated that the universal machine learning based system 12 is not specific to a particular configuration of vehicle. Accordingly, the universal machine learning based system 12 does not require re-training in order to be applied to a different configuration of vehicle. In an embodiment, the configuration of the vehicle indicates one or more of the following: driveline configuration, vehicle class, and powertrain configuration. Some examples of driveline configuration include, but are not limited to, all-wheel-drive (AWD), front wheel drive (FWD), rear wheel drive (RWD), and 4WD (4 wheel drive). Some examples of vehicle class include, but are not limited to, but are not limited to, sedan, truck, and sport utility vehicle (SUV). Some examples of powertrain configuration include, but are not limited to, spark ignition (SI) engines, compression ignition (CI) engines, and electric motors.

FIG. 2 is a block diagram illustrating the one or more controllers 20 shown in FIG. 1, where the one or more controllers 20 include a sensitivity analysis module 42, a feature composition module 44, and a machine learning estimator module 46 that estimates the vehicle state. In the embodiment as shown in FIG. 2, the machine learning estimator module 46 estimates the lateral velocity $\widehat{v_y}$ of the vehicle 10, however, as mentioned above any number of different vehicle states may be estimated. The one or more controllers 20 receive a plurality of dynamic variables 50 as input from the one or more sensors 22 and the one or more vehicle controllers 24 (seen in FIG. 1). The dynamic variables 50 each represent an operating parameter of the vehicle 10 that is relevant for estimating the vehicle state that the one or more controllers 20 is estimating. In the exemplary embodiment as shown in FIG. 2, the one or more controllers 20 estimate the lateral velocity $\widehat{v_y}$ of the vehicle 10. Accordingly, it follows that the plurality of dynamic variables 50 include operating parameters of the vehicle 10 that are relevant for estimating the lateral velocity $\widehat{v_y}$ of the vehicle 10 in the embodiment as shown in FIG. 2. In an embodiment, the plurality of dynamic variables 50 for estimating the lateral velocity $\widehat{v_y}$ of the vehicle 10 include a yaw rate $\Psi$, a lateral acceleration $a_y$, a longitudinal acceleration $a_x$, a steering wheel angle $\delta$, and the angular wheel speed velocity $\omega_w$ of each wheel 40 of the vehicle 10.

Continuing to refer to FIG. 2, the sensitivity analysis module 42 of the one or more controllers 20 receive the plurality of dynamic variables 50 and corresponding historical data 52 as input. The corresponding historical data 52 may be stored on a database that is separate from the one or more controllers 20 or, alternatively, in memory 48 of the one or more controllers 20. The corresponding historical data 52 includes historical data for each of the plurality of dynamic variables 50 (i.e., the yaw rate $\Psi$, a lateral acceleration $a_y$, a longitudinal acceleration $a_x$, a steering wheel angle $\delta$, and the angular wheel speed velocity $\omega_w$ of each wheel 40) with respect to a time step horizon. The corresponding historical data 52 also includes historical augmented dynamic variables that are calculated based on the one or more dynamic variables 50. Some examples of historical augmented dynamic variables include, but are not limited to, corner lateral acceleration $a_{ycorner}$ and lateral tire force $F_y$, where the corner lateral acceleration may be expressed as $a_{ycorner}=a_y-\Psi v_x$, where $v_x$ is the longitudinal velocity.

The sensitivity analysis module 42 of the one or more controllers 20 executes a sensitivity analysis algorithm over each of the plurality of dynamic variables 50 and the corresponding historical data 52 to determine the effect of each dynamic variable 50 on the vehicle state, and selects two or more pertinent dynamic variables 60 based on a sensitivity level determined by the sensitivity analysis algorithm for each dynamic variable 50 and the corresponding historical data 52. In one non-limiting embodiment, gradient boosted regression trees (GBRT) modeling is the sensitivity analysis algorithm, however, it is to be appreciated that the embodiment is merely exemplary in nature and any type of sensitivity analysis algorithm may be used. The sensitivity analysis algorithm determines the sensitivity level for each dynamic variable 50, where the sensitivity level indicates the effect of a selected dynamic variable 50 on the vehicle state being estimated by the one or more controllers 20. In one embodiment, the sensitivity level is expressed as a percentage, where a higher percentage indicates the selected dynamic variable 50 has a greater effect on the specific vehicle state and a lower percentage indicates the selected dynamic variable 50 has a lesser effect on the specific vehicle state.

The sensitivity analysis module 42 compares the sensitivity level for each dynamic variable 50 and the corresponding historical data 52 with a sensitivity threshold value. In response to determining the sensitivity level for a selected dynamic variable 50 is equal to or greater than the sensitivity threshold value, the sensitivity analysis module 42 selects the selected dynamic variable 50 or the corresponding historical data 52 as one of the pertinent dynamic variables 60. It is to be appreciated that the sensitivity threshold value is an adjustable value that may be increased or decreased based on application requirements such as, for accuracy requirements and hardware capacity. For example, for applications requiring a relatively high degree of accuracy, the sensitivity threshold value may be lowered in order to be more inclusive. Similarly, if the hosting hardware has limited hardware capacity, then the sensitivity threshold value may be increased in order to trim the number of pertinent dynamic variables 60. In the non-limiting embodiment as shown in FIG. 2, the pertinent dynamic variables 60 for the lateral velocity $\widehat{v_y}$ of the vehicle 10 include the longitudinal acceleration $a_x$, the lateral acceleration $a_y$, the yaw rate $\Psi$, the steering wheel angle $\delta$, the angular wheel speed velocity $\omega_w$ of each wheel 40, and the corner lateral acceleration $a_{ycorner}$ (which is also expressed as $a_y-\Psi v_x$).

The pertinent dynamic variables 60 are then sent to the feature composition module 44 of the one or more controllers 20. The feature composition module 44 standardizes the pertinent dynamic variables 60 into generic dynamic variables 62, where the generic dynamic variables 62 are in a standardized format that is applicable to any configuration of vehicle. That is, the generic dynamic variables 62 are applicable to determine the vehicle state (in this example, the longitudinal velocity $\widehat{v_y}$ for any configuration of vehicle. In other words, the generic dynamic variables 62 are applicable regardless of the driveline configuration, the vehicle class, and the powertrain configuration of a vehicle. As explained below, the feature composition module 44 of the one or more controllers 20 combines an individual pertinent dynamic variable 60 with a relevant vehicle parameter 64 to normalize the individual pertinent dynamic variable 60 into the generic dynamic variable 62. The relevant vehicle parameters 64 may be stored on a database that is separate from the one or more controllers 20 or, alternatively, in memory 48 of the one or more controllers 20.

The relevant vehicle parameter 64 is a fixed value representing a parameter of either the vehicle 10 or data collected from another configuration of vehicle that is part of a training dataset. It is to be appreciated that some parameters such as, for example, the center-of-gravity and the wheel effective radius of a vehicle may be updated in real time, however, the values of these parameters are not changed substantially and may be considered fixed values. As mentioned above, another configuration of vehicle includes vehicles of having a different driveline configuration, class, and powertrain configuration. It is also to be appreciated that that the relevant vehicle parameter 64 is obtained by vehicle testing or by simulation results. Some examples of relevant vehicle parameters 64 include, but are not limited to, vehicle weight m, vehicle yaw moment of inertia $I_z$, wheel effective radius $R_{eff}$, vehicle track width $T_w$, vehicle front axle to center-of-gravity (CG) distance a, vehicle rear axle CG distance b, and steering ratio $S_{ratio}$.

The feature composition module 44 of the one or more controllers 20 determines an individual generic dynamic variable 62 by first identifying the relevant vehicle parameter 64 that corresponds to the pertinent dynamic variable 60. The relevant vehicle parameter 64 is identified based on one or more model-based dynamic equations that solve for the vehicle state. At least one of the model-based dynamic equations include the pertinent dynamic variable 60 and the relevant vehicle parameter 64. The relevant vehicle parameter 64 is then combined with the pertinent dynamic variable 60 to determine the generic dynamic variable 62, where combining the relevant vehicle parameter 64 with the pertinent dynamic variable 60 includes one or more of the following: multiplying, dividing, adding, or subtracting the pertinent dynamic variables 60 with the generic dynamic variable 62.

For example, in the embodiment as shown in FIG. 2, the generic dynamic variables 62 include the longitudinal acceleration $a_x$ and the lateral acceleration $a_y$ that are multiplied by vehicle weight m. Equations 1 and 2 solve for the longitudinal acceleration $a_x$, where Equation 1 solves for velocity and Equation 2 includes the longitudinal acceleration $a_x$.

$$V = R_{eff} \omega_w \qquad \text{Equation 1}$$

where $V$ is velocity.

$$ma_x = \Sigma F_x = (m\dot{v}_x - \dot{\psi} v_y) \qquad \text{Equation 2}$$

where $\psi$ is the yaw rate, $F_x$ is the longitudinal force, and $v_y$ is the lateral velocity. Equations 3 and 4 solve for the lateral acceleration $a_y$, where Equation 3 includes the lateral acceleration $a_y$ and Equation 4 solves for the front tire force $F_{ya}$ and the rear tire force $F_{yb}$. Specifically, Equation 3 is as follows:

$$a_y = V\dot{\beta} + V\dot{\Psi} \qquad \text{Equation 3}$$

where V is velocity, $\dot{\beta}$ is the rate of sideslip, and $\dot{\Psi}$ is the yaw rate. Equation 4, which is based on Equation 3, is as follows:

$$mV + (\dot{\beta} + \dot{\Psi}) = F_{ya} + F_{yb} \qquad \text{Equation 4}$$

As seen in Equations 3 and 4, the lateral acceleration $a_y$ is determined based on the vehicle weight m. In the present example for the longitudinal acceleration $a_x$ and the lateral acceleration $a_y$, the vehicle weight m is the relevant vehicle parameter 64.

Continuing to refer to FIG. 2, the generic dynamic variables 62 include the yaw rate $\Psi$ multiplied by the vehicle yaw moment of inertia $I_z$. Referring to Equation 5 below, the product of the vehicle yaw moment of inertia $I_z$ and a second time derivative of the yaw rate $\Psi$ is equal to a sum of the moments of the front tire force $F_{ya}$ and the rear tire force $F_{yb}$, and is expressed as:

$$I_z \ddot{\psi} = a F_{ya} + b F_{yb} \qquad \text{Equation 5}$$

The generic dynamic variables 62 also include the steering wheel angle $\delta$ divided by the steering ratio $S_{ratio}$. Referring to Equation 6 below, the relationship between the steering wheel angle $\delta$ and the steering ratio $S_{ratio}$ is expressed as:

$$\delta_w = S_{ratio} \cdot \delta \qquad \text{Equation 6}$$

where $\delta_w$ is the wheel angle. The generic dynamic variables 62 include the product of the angular wheel speed velocity $\omega_w$ of each wheel 40 and the wheel effective radius Rett. Referring to Equation 7 below, the relationship between the angular wheel speed velocity $\omega_w$ of each wheel 40 and the wheel effective radius Rett is expressed as:

$$V = \omega_w (R_{eff}) \qquad \text{Equation 7}$$

It is to be appreciated that the historical augmented dynamic variables such as, for example, the corner lateral acceleration $a_{ycorner} = a_y - \Psi v_x$ are not combined with a relevant vehicle parameter 64 in order to determine an generic dynamic variable 62.

The machine learning estimator module 46 of the one or more controllers 20 receives the generic dynamic variables 62 from the feature composition module 44 and estimates the vehicle state based on the generic dynamic variables 62. Specifically, the machine learning estimator module 46 of the one or more controllers 20 estimates the vehicle state based on the generic dynamic variables 62 by one or more machine learning algorithms. In an embodiment, the machine learning estimator module 46 estimates the vehicle state based on the generic dynamic variables 62 by one or more data-driven machine learning algorithms such as, but not limited to, a forward neural network, a long short-term memory (LSTM) neural network, and non-parametric kernel based methods.

FIG. 3 is an illustration of the one or more controllers 20 determining the vehicle state, which is the longitudinal velocity $\widehat{v_x}$ of the vehicle 10. Accordingly, it follows that the plurality of dynamic variables 50 include operating parameters of the vehicle 10 that are relevant for estimating the longitudinal velocity $\widehat{v_x}$ of the vehicle 10. In an embodiment, the plurality of dynamic variables 50 for estimating the longitudinal velocity $\widehat{v_x}$ of the vehicle 10 include the longitudinal acceleration $a_x$, the lateral acceleration $a_y$, the yaw rate $\Psi$, the steering wheel angle $\delta$, and the angular wheel speed velocity $\omega_w$ of each wheel 40, a wheel speed difference, and corner acceleration of each wheel 40. The sensitivity analysis module 42 of the one or more controllers 20 executes the sensitivity analysis algorithm for the dynamic variables 50 and the corresponding historical data 52 to select two or more pertinent dynamic variables 60. In the embodiment as shown in FIG. 3 where the vehicle state that is being estimated is the longitudinal velocity $\widehat{v_x}$ of the vehicle 10, the two or pertinent dynamic variables 60 include the longitudinal acceleration $a_x$, the yaw rate $\Psi$, and the angular wheel speed velocity $\omega_w$ of each wheel 40. The feature composition module 44 standardizes the pertinent dynamic variables 60 into the generic dynamic variables 62. In the example as shown in FIG. 3, the generic dynamic variables 62 include the longitudinal acceleration $a_x$ multiplied by the vehicle weight m, the yaw rate $\Psi$ multiplied by the vehicle yaw moment of inertia $I_z$, and the angular wheel speed velocity $\omega_w$ of each wheel 40 multiplied by the wheel effective radius $R_{eff}$.

Figure 4:
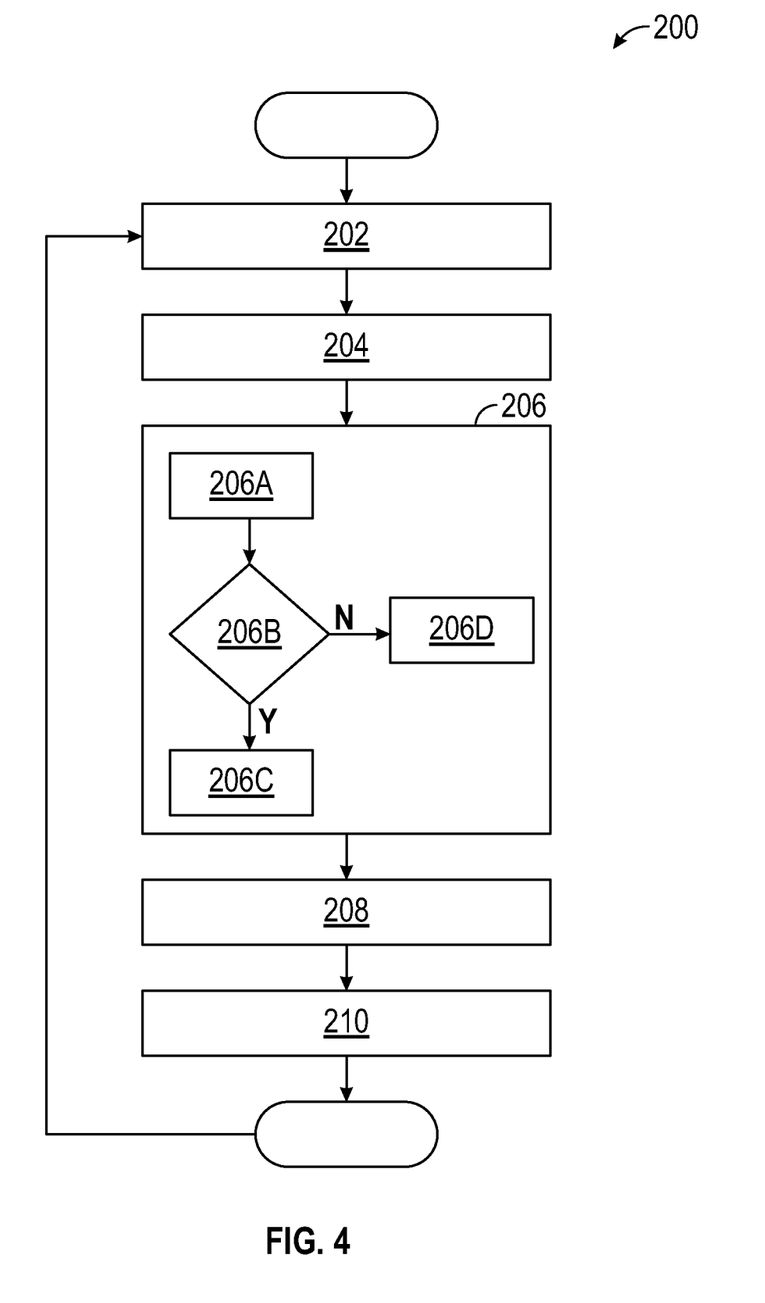
FIG. 4 is a process flow diagram illustrating an exemplary method for determining a vehicle state by the disclosed universal machine learning based system, according to an exemplary embodiment.

FIG. 4 is a process flow diagram illustrating an exemplary method 200 for determining a vehicle state. Referring to FIGS. 1-2 and 4, the method 200 may begin at block 202. In block 202, the sensitivity analysis module 42 of the one or more controllers 20 receive the plurality of dynamic variables 50 and corresponding historical data 52 from the plurality of sensors 22 and the vehicle controllers 24 as input, where the plurality of dynamic variables 50 each represent an operating parameter of the vehicle 10 that is relevant for estimating the vehicle state. The method 200 may then proceed to block 204.

In block 204, the sensitivity analysis module 42 of the one or more controllers 20 execute the sensitivity analysis algorithm to determine the sensitivity level for each dynamic variable 50 and corresponding historical data 52. As mentioned above, the sensitivity level indicates the effect of a selected dynamic variable 50 on the vehicle state. The method 200 may then proceed to block 206.

In block 206, the sensitivity analysis module 42 of the one or more controllers 20 selects the two or more pertinent dynamic variables 60 based on the sensitivity level of each dynamic variable 50 and the corresponding historical data 52. Specifically, in block 206A the sensitivity analysis module 42 compares the sensitivity level for each dynamic variable 50 and the corresponding historical data 52 with the sensitivity threshold value. In decision block 206B, if the sensitivity level for a selected dynamic variable 50 is equal to or greater than the sensitivity threshold value, then the method 200 proceeds to block 206C and the sensitivity analysis module 42 of the one or more controllers 20 selects the selected dynamic variable 50 or the corresponding historical data 52 as one of the pertinent dynamic variables 60. Otherwise, the method 200 proceeds to block 206D, and the selected dynamic variable 50 is not selected. The method 200 may then proceed to block 208.

In block 208, the feature composition module 44 of the one or more controllers 20 standardize the two or more pertinent dynamic variables 50 into the plurality of generic dynamic variables 62, where the plurality of generic dynamic variables 62 are in a standardized format that is applicable to any configuration of vehicle. As mentioned above, the feature composition module 44 of the one or more controllers 20 determines an generic dynamic variable 62 by first identifying the relevant vehicle parameter 64 that corresponds to the pertinent dynamic variable 60. The relevant vehicle parameter 64 is identified by based on one or more model-based dynamic equations for solving the vehicle state that include the pertinent dynamic variable 60 and the relevant vehicle parameter 64. The relevant vehicle parameter 64 is then combined with the pertinent dynamic variables 60 to determine the generic dynamic variable 62. The method 200 may then proceed to block 210.

In block 210, the machine learning estimator module 46 of the one or more controllers 20 estimates the vehicle state based on the plurality of generic dynamic variables 62 by one or more machine learning algorithms. The method 200 may then terminate or return to block 202.

Referring generally to the figures, the disclosed universal machine learning based system provides various technical effects and benefits by providing a model for estimating the vehicle state that is applicable to various types of vehicle configurations. Current machine learning estimation approaches that presently available are focused on a single vehicle configuration, and therefore require re-training when applying the machine learning model to another vehicle having a different configuration. In contrast, the current approach provides a cost effective model that may be used for different vehicle configurations. Furthermore, the current approach also provides improved accuracy for estimating vehicle states when compared the current approaches used today, especially during non-linear operating conditions.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A universal machine learning based system for estimating a vehicle state of a vehicle, the universal machine learning based system comprising:
   one or more controllers executing instructions to:
      receive a plurality of dynamic variables and corresponding historical data, wherein the plurality of dynamic variables each represent an operating parameter of the vehicle that is relevant for estimating the vehicle state;
      execute a sensitivity analysis algorithm to determine a sensitivity level for each dynamic variable and corresponding historical data, wherein the sensitivity level indicates the effect of a selected dynamic variable on the vehicle state;
      select two or more pertinent dynamic variables based on the sensitivity level of each dynamic variable and the corresponding historical data;
      standardize the two or more pertinent dynamic variables into a plurality of generic dynamic variables, wherein the plurality of generic dynamic variables are in a standardized format that is applicable to any configuration of vehicle;
      estimate the vehicle state based on the plurality of generic dynamic variables by one or more machine learning algorithms; and
      provide the vehicle state to a motion control system of the vehicle, wherein the motion control system enhances driver control of the vehicle based on the vehicle state.

2. The universal machine learning based system of claim 1, wherein the one or more controllers determine an individual generic dynamic variable by:
 identifying a relevant vehicle parameter that corresponds to a pertinent dynamic variable; and
 combining the relevant vehicle parameter with a pertinent dynamic variable to determine a generic dynamic variable.

3. The universal machine learning based system of claim 2, wherein the one or more controllers identify the relevant vehicle parameter based on one or more model-based dynamic equations that solve for the vehicle state, and wherein at least one of the model-based dynamic equations include the pertinent dynamic variable and the relevant vehicle parameter.

4. The universal machine learning based system of claim 2, wherein the relevant vehicle parameter is a fixed value representing a parameter of either the vehicle or data collected from another configuration of vehicle that is part of a training dataset.

5. The universal machine learning based system of claim 2, wherein the relevant vehicle parameter is one of the following: vehicle weight, vehicle yaw moment of inertia, wheel effective radius, vehicle track width, vehicle front axle to center-of-gravity (CG) distance, vehicle rear axle CG distance, and steering ratio.

6. The universal machine learning based system of claim 2, wherein combining the relevant vehicle parameter with the pertinent dynamic variable includes one or more of the following: multiplying, dividing, adding, or subtracting the pertinent dynamic variable with the generic dynamic variable.

7. The universal machine learning based system of claim 1, wherein selecting the two or more pertinent dynamic variables based on the sensitivity level of each dynamic variable and the corresponding historical data comprises:
 compare the sensitivity level for each dynamic variable and the corresponding historical data with a sensitivity threshold value; and
 in response to determining the sensitivity level for a selected dynamic variable is equal to or greater than the sensitivity threshold value, selecting the selected dynamic variable or the corresponding historical data as one of the pertinent dynamic variables.

8. The universal machine learning based system of claim 1, wherein the sensitivity analysis algorithm is gradient boosted regression trees (GBRT) modeling.

9. The universal machine learning based system of claim 1, further comprising:
 a plurality of sensors configured to monitor data indicative of a dynamic state of a vehicle and one or more vehicle controllers, wherein the plurality of sensors and the one or more vehicle controllers are in electronic communication with the one or more controllers.

10. The universal machine learning based system of claim 9, wherein the plurality of dynamic variables are generated by the plurality of sensors and the one or more vehicle controllers.

11. The universal machine learning based system of claim 1, wherein the vehicle state is one of the following: lateral velocity, longitudinal velocity, normal tire force, longitudinal tire force, lateral tire force, sideslip, slip ratio, bank angle, grade angle, roll stiffness, pitch stiffness, vehicle mass, and pitch angle.

12. The universal machine learning based system of claim 1, wherein the configuration of the vehicle indicates one or more of the following: driveline configuration, vehicle class, and powertrain configuration.

13. A vehicle including a universal machine learning based system for estimating a vehicle state of a vehicle, the vehicle comprising:
 a plurality of sensors configured to monitor data indicative of a dynamic state of the vehicle
 one or more vehicle controllers; and
 one or more controllers in electronic communication with the plurality of sensors and the one or more vehicle controllers, the one or more controllers executing instructions to:
  receive a plurality of dynamic variables and corresponding historical data from the plurality of sensors and the one or more vehicle controllers, wherein the plurality of dynamic variables each represent an operating parameter of the vehicle that is relevant for estimating the vehicle state;
  execute a sensitivity analysis algorithm to determine a sensitivity level for each dynamic variable and corresponding historical data, wherein the sensitivity level indicates the effect of a selected dynamic variable on the vehicle state;
  select two or more pertinent dynamic variables based on the sensitivity level of each dynamic variable and the corresponding historical data;
  standardize the two or more pertinent dynamic variables into a plurality of generic dynamic variables, wherein the plurality of generic dynamic variables are in a standardized format that is applicable to any configuration of vehicle;
  estimate the vehicle state based on the plurality of generic dynamic variables by one or more machine learning algorithms; and
  provide the vehicle state to a motion control system of the vehicle, wherein the motion control system enhances driver control of the vehicle based on the vehicle state.

14. The vehicle of claim 13, wherein the one or more controllers determine an individual generic dynamic variable by:
 identifying a relevant vehicle parameter that corresponds to a pertinent dynamic variable; and
 combining the relevant vehicle parameter with the pertinent dynamic variable to determine a generic dynamic variable.

15. The vehicle of claim 14, wherein the one or more controllers identify the relevant vehicle parameter based on one or more model-based dynamic equations that solve for the vehicle state, wherein at least one of the model-based dynamic equations include the pertinent dynamic variable and the relevant vehicle parameter.

16. The vehicle of claim 14, wherein the relevant vehicle parameter is a fixed value representing a parameter of either the vehicle or data collected from another configuration of vehicle that is part of a training dataset.

17. A method for estimating a vehicle state of a vehicle by a universal machine learning based system, the method comprising:
 receiving, by one or more controllers, a plurality of dynamic variables and corresponding historical data, wherein the plurality of dynamic variables each represent an operating parameter of the vehicle that is relevant for estimating the vehicle state;
 executing a sensitivity analysis algorithm to determine a sensitivity level for each dynamic variable and corresponding historical data, wherein the sensitivity level indicates the effect of a selected dynamic variable on the vehicle state;

selecting two or more pertinent dynamic variables based on the sensitivity level of each dynamic variable and the corresponding historical data;

standardizing the two or more pertinent dynamic variables into a plurality of generic dynamic variables, wherein the plurality of generic dynamic variables are in a standardized format that is applicable to any configuration of vehicle;

estimating the vehicle state based on the plurality of generic dynamic variables by one or more machine learning algorithms; and providing the vehicle state to a motion control system of the vehicle, wherein the motion control system enhances driver control of the vehicle based on the vehicle state.

18. The method of claim 17, further comprising:
identifying, by the one or more controllers, a relevant vehicle parameter that corresponds to the pertinent dynamic variable; and combining the relevant vehicle parameter with a pertinent dynamic variable to determine a generic dynamic variable.

19. The method of claim 18, further comprising:
identifying the relevant vehicle parameter based on one or more model-based dynamic equations that solve for the vehicle state, wherein at least one of the model-based dynamic equations include the pertinent dynamic variable and the relevant vehicle parameter.

20. The method of claim 17, wherein selecting the two or more pertinent dynamic variables based on the sensitivity level of each dynamic variable and the corresponding historical data comprises:

comparing the sensitivity level for each dynamic variable and the corresponding historical data with a sensitivity threshold value; and in response to determining the sensitivity level for a selected dynamic variable is equal to or greater than the sensitivity threshold value, selecting the selected dynamic variable or the corresponding historical data as one of the pertinent dynamic variables.

* * * * *